2,823,767

PRODUCTION OF CHEMICALS

James H. Gardner, Weston, Erwin F. Schoenbrunn, Needham, and Nat C. Robertson, Wellesley, Mass., assignors to Escambia Chemical Corporation, Pace, Fla., a corporation of Delaware No Drawing. Application July 1, 1957
Serial No. 668,852

5 Claims. (Cl. 183—120)

This invention relates to the separation of chemicals and in particular to the separation of hydrogen peroxide from gaseous mixtures containing the same. This application is, in part, a continuation of copending application Serial No. 432,596, filed May 26, 1954, now abandoned.

A principal object of the present invention is to provide a process whereby hydrogen peroxide may be separated from gaseous mixtures containing hydrogen peroxide, formaldehyde, acetaldehyde and water.

Another object of the present invention is to separate hydrogen peroxide from gaseous mixtures of the above type by means of a partial condensation.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

It is known that substantial quantities of hydrogen peroxide can be formed, under suitable conditions, by the partial oxidation of normally gaseous hydrocarbons such as ethane, propane, butane, isobutane or mixtures thereof. However, under the reaction conditions thus far set forth for such partial oxidations, appreciable quantities of aldehydes and, in particular, formaldehyde and acetaldehyde are also formed in addition to hydrogen peroxide. Partial oxidations of the above type producing mixtures of such products may be found in U. S. Patents 2,376,257, 2,416,156, 2,533,581 and in the copending application of Gardner et al., Serial No. 370,065, filed July 24, 1953, now Patent No. 2,775,510.

The separation of hydrogen peroxide from a condensed mixture comprising hydrogen peroxide and aldehydes, however, is complicated by the fact that hydrogen peroxide reacts with the aldehydes present to form equilibrium systems in which the equilibria favor the production of organic hydroxy peroxides. The reaction between hydrogen peroxide and an aldehyde is thus believed to proceed in two consecutive, reversible steps as follows:

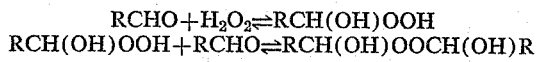

$$RCHO + H_2O_2 \rightleftharpoons RCH(OH)OOH$$
$$RCH(OH)OOH + RCHO \rightleftharpoons RCH(OH)OOCH(OH)R$$

These hydroxy alkyl peroxides are very difficult to separate from hydrogen peroxide by commonly employed extraction and distillation methods. Thus, in order to obtain high percentage recovery of hydrogen peroxide in pure form from the reaction products, it has been proposed either to remove the hydrogen peroxide before it can react with the aldehydes or to use techniques causing substantially complete reversal of the reactions given above.

It has been found that hydrogen peroxide can be selectively removed from gaseous mixtures containing hydrogen peroxide, formaldehyde, acetaldehyde and water by means of a partial condensation. In the present invention, hydrogen peroxide is effectively separated from gaseous mixtures of the above type by cooling the gaseous mixture so as to selectively and rapidly condense the hydrogen peroxide and water contained therein. The aqueous hydrogen peroxide condensate is preferably formed by cooling the gaseous mixture to a temperature between about 0° C. or somewhat below to about 10° C.

In one preferred embodiment of the invention, the aqueous hydrogen peroxide condensate thus formed is preferably rapidly removed from contact with the gaseous mixture. One method of accomplishing this is by flushing the condensate from the condenser. The flushing medium employed is preferably an oil which (a) readily flows at the low condenser temperatures, (b) is inert to hydrogen peroxide, (c) exhibits low solubility for formaldehyde and acetaldehyde and (d) is immiscible with the aqueous hydrogen peroxide condensate.

In another preferred embodiment of the invention, the aqueous hydrogen peroxide condensate is rapidly removed from contact with the gaseous mixture by means of a white mineral oil having a Saybolt universal viscosity of between about 50 and 250 at 100° F. and preferably between about 125 and 175.

The invention will be particularly described in the following non-limiting examples.

Example I

A gaseous mixture obtained from the partial oxidation of ethane according to the method of the copending application of Gardner et al., Serial No. 370,065, filed July 24, 1953, was passed through a condenser 11 cm. long and 2 mm. in diameter at a velocity of about 2000 cm. per second. The condenser during the rapid passage of the gaseous mixture was maintained at a temperature on the order of about 0° C. The mole ratio of hydrogen peroxide to total aldehydes in the gaseous mixture entering the cold condenser was about 0.6:1. As the gaseous mixture passed through the condenser, the condensate, aqueous hydrogen peroxide, was rapidly washed from the condenser walls by slugs of a white mineral oil having a Saybolt universal viscosity of between 140 and 150 at 100° F. The white mineral oil was supplied from a burette, the tip of which was positioned in the upper portion of the condenser above the point of introduction of the gaseous mixture obtained from the oxidation. The walls of the cold condenser, in this case, were continuously washed with slugs or drops of the white mineral oil which were added dropwise from the burette at a rate of about 0.25 ml. per minute so that the total residence time of the condensate in the condenser was on the order of about one second. Since the internal diameter of the condenser was so small, each drop added thereto was sufficient to come into complete contact with the cold surfaces of the condensers as they passed therethrough.

The mixture obtained from the condenser contained two layers. The upper layer contained the white mineral oil while the lower layer contained an aqueous solution of essentially hydrogen peroxide. 97.1% of the hydrogen peroxide contained in the gaseous mixture entering the condenser was condensed and found in the lower layer. The lower layer, analyzed for peroxide and aldehyde content, showed a mole ratio of hydrogen peroxide to aldehyde of 2.3:1. Thus an enrichment in the mole ratio of hydrogen peroxide to aldehyde by a factor of 3.8 was obtained.

Example II

A gaseous mixture obtained from the partial oxidation of ethane according to the method of the copending application of Gardner et al., Serial No. 370,065, filed July 24, 1953, was passed through a condenser 11 cm. long and 2 mm. in diameter at a velocity of about 2000 cm. per second. The condenser, during the rapid passage of the gaseous mixture, was maintained at a temperature on the order of about 0° C. The mole ratio of hydrogen peroxide to total aldehydes in the gaseous mixtures entering the cold condenser was about 0.6:1. No flushing or washing of the condensate was attempted in this run. 98.5% of the hydrogen peroxide contained in the gaseous mixture entering the condenser was found in the resultant aqueous solution. The aqueous solution, analyzed for peroxide and aldehyde content, showed a mole ratio of hydrogen peroxide to aldehyde of 1.4:1. Thus an enrichment in the mole ratio of hydrogen peroxide to aldehyde by a factor of 2.3:1 was obtained.

In the present invention, hydrogen peroxide is selectively and rapidly condensed from the gaseous product mixture by rapidly passing the gaseous product mixture through a condenser maintained at a temperature of below about 10° C. It is preferable, however, to maintain the temperature on the order of about 0° C., since the amount of hydrogen peroxide condensed decreases with higher temperatures.

In order to prevent side reactions between the aqueous hydrogen peroxide condensate and the aldehydes contained in the gaseous product mixture, it is preferable to remove the condensate from contact with the gaseous product mixture as rapidly as possible. This is preferably achieved by rapidly washing or flushing the aqueous hydrogen peroxide condensate from the condenser walls with a suitable oil and by maintaining high linear gas velocities. The oil employed must be one which (a) readily flows at the low condenser temperatures, (b) is inert to hydrogen peroxide, (c) exhibits low solubility for formaldehyde and acetaldehyde present in the gaseous mixture and (d) is immiscible with the aqueous hydrogen peroxide condensate. Among the oils possessing these essential requisites are various fluorocarbons and white mineral oils. White mineral oils with a Saybolt universal viscosity of between about 50 and 250 at 100° F. have been found to be most satisfactory. In one preferred embodiment of the invention, it has been found preferable to employ a white mineral oil with a Saybolt universal viscosity of between about 125 and 175 at 100° F.

The rate of addition of the white mineral oil to the condenser may be varied over a wide range depending upon such things as the rapidity with which it is desired to remove the condensate and the diameter of the condenser. Under the conditions of the present invention, it has been found satisfactory to maintain a flow rate of white mineral oil such that two volumes of white mineral oil are provided for each volume of condensate. This flow rate of white mineral oil may be varied considerably. However, it should generally be regulated so that the residence time of the condensate in the condenser is below about five seconds and preferably on the order of about one second or less. Additionally, it should be obvious that the use of larger diameter condensers than those illustrated necessitate the use of different means for introducing the white mineral oils into the condenser. Thus with condensers of substantial size, the white mineral oils can be introduced as a spray, by overflow techniques or the like.

The use of white mineral oils to rapidly remove the aqueous hydrogen peroxide condensate from contact with the gaseous product mixture has several advantages over other wash materials such as water. For example, hydrogen peroxide and the other oxygenated products are not affected, either physically or chemically, by the presence of the white mineral oils of the present invention. In addition, hydrogen peroxide, formaldehyde and acetaldehyde are not soluble in the preferred white mineral oils. Thus the white mineral oil passing through the condenser to remove the aqueous hydrogen peroxide condensate will not dissolve or scrub out of the gaseous product mixture any of the aldehydes, as is the case of water. Also, since the hydrogen peroxide condensate and the white mineral oils are immiscible, there will be no dilution of the resulting aqueous hydrogen peroxide solution and thus more concentrated solutions can be obtained. The immiscibility of the aqueous hydrogen peroxide solutions and the white mineral oils also provides for an easy and economical means of recovering hydrogen peroxide. The mixture obtained from the condenser will be comprised of two layers. The upper layer will contain the white mineral oil employed while the lower layer will contain an aqueous solution of essentially hydrogen peroxide. The aqueous hydrogen peroxide solution can be readily drained from the upper oil layer and stored or else subjected to further purification processes or concentration or utilized in the preparation of metallic peroxides. The recovered white mineral oil may be recycled for further use.

The effectiveness of rapidly removing the aqueous hydrogen peroxide condensate from contact with the gaseous product mixture by means of a white mineral oil is illustrated in a comparison of Example I with Example II. In Example I, the mole ratio of hydrogen peroxide to aldehyde in the aqueous solution finally obtained was 2.3:1. In Example II, which employed no flush, the mole ratio of hydrogen peroxide to aldehyde in the finally obtained aqueous solution was 1.4:1. Thus considerably more formaldehyde and acetaldehyde are present in the aqueous hydrogen peroxide solutions obtained in Example II than are present in the solution obtained in Example I which embodied the inventive concepts of the present invention.

Since certain changes may be made in the above process without departing from the scope of the invention herein involved, it is intended that all matter contained in the above description shall be interpreted as illustrative and not in a limiting sense.

What is claimed is:

1. A process of separating hydrogen peroxide from a gaseous mixture comprised of hydrogen peroxide, formaldehyde, acetaldehyde and water which comprises the steps of cooling said gaseous mixture to a temperature below about 10° C., rapidly washing the condensate formed from contact with said gaseous mixture with a white mineral oil, and recovering hydrogen peroxide from the resultant mixture.

2. A process of separating hydrogen peroxide from a gaseous mixture comprised of hydrogen peroxide, formaldehyde, acetaldehyde and water which comprises the steps of cooling said gaseous mixture to a temperature below about 10° C. to condense the hydrogen peroxide and water contained therein, rapidly washing the aqueous hydrogen peroxide condensate from contact with said gaseous mixture with a white mineral oil having a Saybolt universal viscosity of between 50 and 250 seconds at 100° F., and recovering an aqueous solution of hydrogen peroxide from the resultant mixture.

3. A process of separating hydrogen peroxide from a gaseous mixture comprised of hydrogen peroxide, formaldehyde, acetaldehyde and water which comprises the steps of cooling said gaseous mixture to a temperature on the order of about 0° C. to condense the hydrogen peroxide and water contained therein, rapidly washing the aqueous hydrogen peroxide condensate from contact with said gaseous mixture with a white mineral oil having a Saybolt universal viscosity of between 50 and 250 seconds at 100° F., and recovering an aqueous solution of hydrogen peroxide from the resultant mixture.

4. A process of separating hydrogen peroxide from a gaseous mixture comprised of hydrogen peroxide, formaldehyde, acetaldehyde and water which comprises the steps of cooling said gaseous mixture to a temperature on the order of about 0° C. to condense the hydrogen peroxide and water contained therein, washing the aqueous hydrogen peroxide condensate within five seconds after formation from contact with said gaseous mixture with a white mineral oil having a Saybolt universal viscosity of between 125 and 175 seconds at 100° F., and recovering an aqueous solution of hydrogen peroxide from the resultant mixture.

5. A process of separating hydrogen peroxide from a gaseous mixture comprised of hydrogen peroxide, formaldehyde, acetaldehyde and water which comprises the steps of cooling said gaseous mixture to a temperature on the order of about 0° C. to condense the hydrogen peroxide and water contained therein, washing the aqueous hydrogen peroxide condensate within one second after formation from contact with said gaseous mixture with a white mineral oil having a Saybolt universal viscosity of between 125 and 175 seconds at 100° F., and recovering an aqueous solution of hydrogen peroxide from the resultant mixture.

References Cited in the file of this patent

UNITED STATES PATENTS

| 2,376,257 | Lacomble | May 15, 1945 |
| 2,394,849 | Doumani et al. | Feb. 12, 1946 |

OTHER REFERENCES

Satterfield et al.: "Industrial and Engineering Chemistry," vol. 46, pages 1007–1010 (1954).